(12) United States Patent
Kakkori et al.

(10) Patent No.: US 7,973,823 B2
(45) Date of Patent: Jul. 5, 2011

(54) METHOD AND SYSTEM FOR IMAGE PRE-PROCESSING

(75) Inventors: Hannu Kakkori, Tokyo (JP); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 631 days.

(21) Appl. No.: 11/648,131

(22) Filed: Dec. 29, 2006

(65) Prior Publication Data

US 2008/0158375 A1 Jul. 3, 2008

(51) Int. Cl.
 H04N 5/228 (2006.01)
 H04N 5/76 (2006.01)
(52) U.S. Cl. .................. 348/222.1; 348/231.99
(58) Field of Classification Search ........... 348/222.1, 348/207.99, 231.99–231.9
See application file for complete search history.

(56) References Cited

U.S. PATENT DOCUMENTS

| | | | | |
|---|---|---|---|---|
| 5,629,734 | A * | 5/1997 | Hamilton et al. | 348/222.1 |
| 6,288,743 | B1 * | 9/2001 | Lathrop | 348/231.9 |
| 6,614,466 | B2 * | 9/2003 | Thomas | 348/14.13 |
| 7,027,665 | B1 * | 4/2006 | Kagle et al. | 382/284 |
| 7,489,344 | B2 * | 2/2009 | Fukuoka et al. | 348/222.1 |
| 7,551,205 | B2 * | 6/2009 | Kubo et al. | 348/222.1 |
| 2001/0035909 | A1 * | 11/2001 | Kubo | 348/232 |
| 2005/0078194 | A1 * | 4/2005 | Gonzalez | 348/222.1 |
| 2005/0197159 | A1 | 9/2005 | Silverbrook et al. | 455/556.2 |

FOREIGN PATENT DOCUMENTS

| EP | 1434171 | 6/2004 |
|---|---|---|
| GB | 2 339 | 2/2000 |

OTHER PUBLICATIONS

PNX17xx Series Data Book, Anonymous, Internet Citation Mar. 17, 2006, XP002457948, Retrieved from the Internet: URL: http://nxp.com/acrobat_downloan/datasheets/PNX17XX_SER_ N_1.pdf [retrieved on Nov. 7, 2007] Chapter 2, particularly figure 2, 1.1, 7.3, 7.4, Chapter 19, particularly 1., 2.3, 2.4 and 3. Chapter 20, particularly figure 1, 2.3, 3.1, 4.

* cited by examiner

Primary Examiner — Nhan T Tran
Assistant Examiner — Richard Bemben
(74) Attorney, Agent, or Firm — Ware, Fressola, Van Der Sluys & Adolphson, LLP

(57) ABSTRACT

An imaging architecture has a memory module to store raw images for the pre-processing stage. The raw image from the output of the pre-processing block may be compressed by a compressor before the image is stored in the memory module. Furthermore, the raw image in the memory is subject to pre-processing as many times as needed or desired. Thus, a decompressor may be operatively connected to the memory module to retrieve the stored image and to decompress the retrieved image before providing the image to the pre-processing block. In the imaging architecture, a loop formed by the memory module, the decompressor, the pre-processing block and the compressor allows the image to be pre-processed multiple times. The imaging architecture can be coupled to the main processor and post-processor in an imaging device for further processing the image data for display or for transmission.

23 Claims, 6 Drawing Sheets

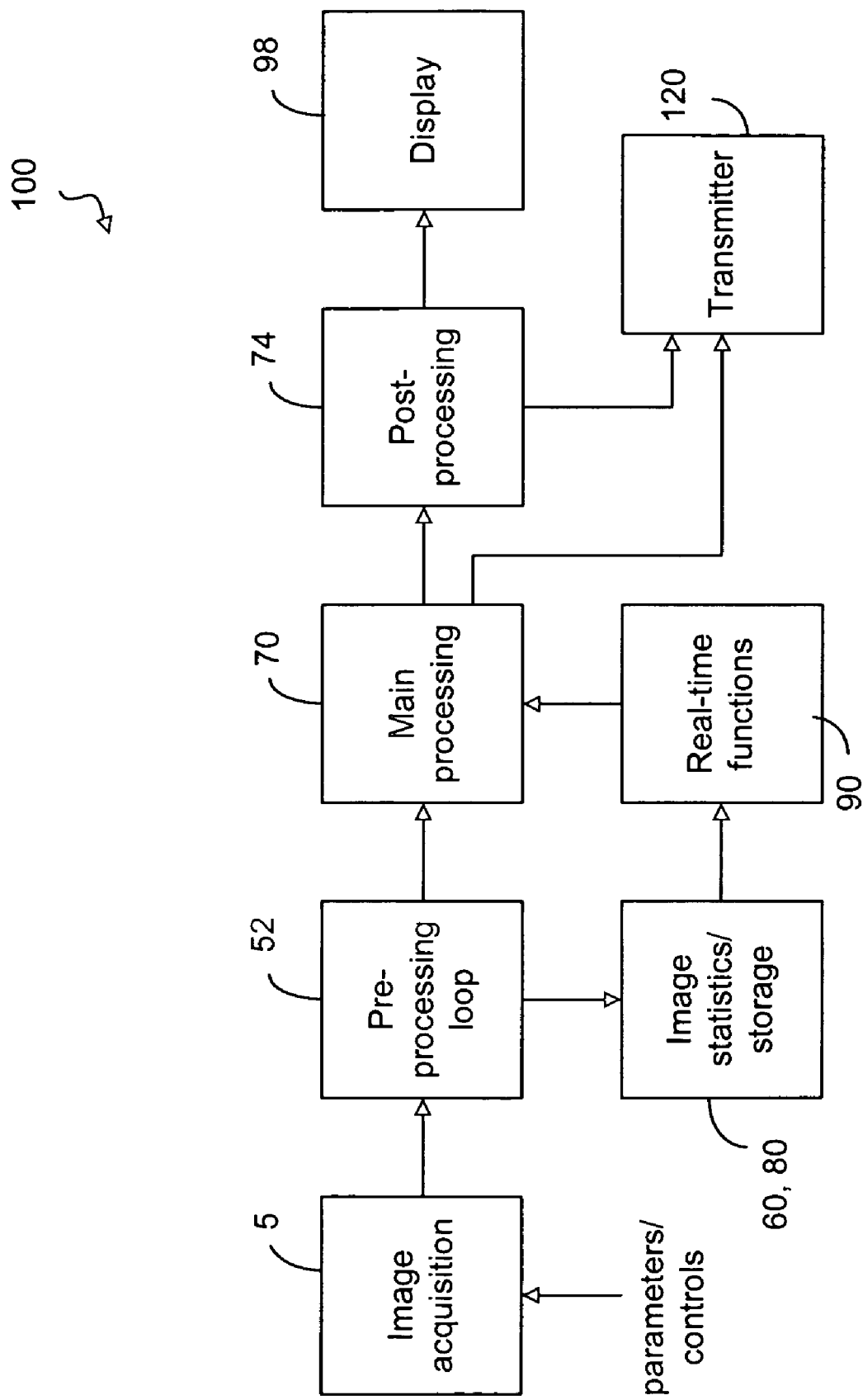

METHOD AND SYSTEM FOR IMAGE PRE-PROCESSING

FIELD OF THE INVENTION

The present invention relates generally to still and video imaging and, more particularly, to the preprocessing stage in still and video imaging.

BACKGROUND OF THE INVENTION

Image processing for use in a still or video camera consists of image reconstruction, encoding and real-time camera control. Image reconstruction is typically divided into pre-processing, main processing and post-processing stages, as shown in FIG. 1. Additionally, a memory module can be introduced between the pre-processing block and the main processing block, as shown in FIG. 2. Additional pre-processing can also be made by SW as a memory-to-memory operation.

The role of pre-processing is to normalize different sensors for the main processing stage. The real-time functions are used to adapt to the changing conditions in imaging scene. Real-time functions such as automatic exposure need (statistical) information from the image. Other real time functions include automatic white balance and auto focus. The statistical information from the image is normally collected with a hardware statistics block. Real-time functions are typically carried out by a software block in order to provide various parameters to the main processing. The real-time functions block may also provide various parameters or controls to the image sensor directly or through the main processing.

Pre-processing contains a variety of processing steps that are needed to change the original raw image captured by the camera sensor to a form that can be used in the main processing or in the statistics collection stage. The output of the pre-processing stage is still in raw format. Examples of pre-processing include shading compensation, dead pixel correction, dark current elimination, pixel linearization, noise reduction and green imbalance filtering. These pre-processing steps are carried out either in the camera sensor or in a separate block in the image processor before the main processing stage or the statistics collection stage. In the processing of a raw image, pre-processing is run only once. Image statistics are collected from the raw image for imaging control purposes. Among the typical imaging controls, automatic exposure control, automatic focus control and automatic white balance control require some statistics in the analysis and synthesis part of the algorithm. Other controls include automatic brightness control and automatic contrast control. The statistics can be collected in the forms of histograms, block averages high-pass and band-pass filter sums. Main processing typically contains color filter array interpolation (CFAI) and white balance (WB). All the processing steps that are carried out before WB and CFAI are usually referred to as the pre-processing steps. Main processing changes the raw image to a form that can be shown to an observer. Image display and print are two of such forms. Main processing may contain other operations such as color space conversion, non-linearization (gamma correction), image sharpening, geometric distortion correction, chroma suppression, dithering, image scaling. Most of the functions in these operations can also be referred to as the post-processing functions. Post-processing may also include image cropping. Image cropping as well as image scaling can also be implemented as pre-processing functions. It is possible to run post-processing functions with HW or with SW.

As the size of the pixels in a camera is reduced further and further, additional pre-processing steps may be needed. It is advantageous and desirable to provide a different imaging architecture to fulfil the present need in image pre-processing and to anticipate the future need.

SUMMARY OF THE INVENTION

The present invention provides an imaging architecture wherein a memory module is used to store raw images for the pre-processing stage. More specifically, the raw image from the output of the pre-processing block is compressed by a compressor before the image is stored in the memory module. Furthermore, the raw image in the memory is subject to pre-processing as many times as needed or desired. Thus, a decompressor is operatively connected to the memory module to retrieve the stored image and to decompress the retrieved image before providing the image to the pre-processing block. In the imaging architecture, according to the present invention, a loop formed by the memory module, the decompressor, the pre-processing block and the compressor allows the image to be pre-processed multiple times. In this embodiment, the memory module has two ports, one port is connected to the compressor to receive compressed image data and another port is connected to the decompressor to allow the decompressor to retrieve the stored image. The decompressor is located before the pre-processing block and the compressor is located after the pre-processing block.

In another embodiment of the present invention, the memory module has four ports, two ports are connected to a compressor/decompressor module located before the pre-processing block and the other two ports are connected to another compressor/decompressor module located after the pre-processing block. According to one embodiment of the present invention, the pre-processing stage can be carried out by a hardware block. By carrying out hardware pre-processing multi-times, it is possible to achieve the benefits of the software solution while keeping the power consumption and performance at a higher level.

Thus, the first aspect of the present invention is a method for pre-processing image data. The method comprises:

storing an image in a memory module;

coupling a pre-processing module to the memory module to form a processing loop, wherein the pre-processing module is operatively connected to a plurality of pre-processing parameter sets;

conveying the image from the memory module to the pre-processing module via the loop so as to allow the pre-processing module to pre-process the image in multiple times, wherein the parameter sets used for pre-processing in at least some of the multiple times are different from the parameter sets used for pre-processing in other of the multiple times, wherein the image stored in the memory module comprises a raw image.

The method further comprises compressing the image for providing an compressed image before storing the image in the memory module; and retrieving the compressed image from the memory module; and decompressing the retrieved image before conveying the image to the pre-processing module.

The second aspect of the present invention is an image pre-processing module. The pre-processing module comprises:

a memory module for storing at least an image; and a pre-processor coupled to the memory module to form a loop, wherein the pre-processing module is operatively connected to a plurality of pre-processing parameter sets, and wherein the loop is configured for conveying the image from the memory module to the pre-processing module via the loop so as to allow the pre-processing module to pre-process the image in multiple times, wherein the parameter sets used for pre-processing in at least some of the multiple times are different from the parameter sets used for pre-processing in other of the multiple times.

The pre-processing module further comprises:

a compressor, operatively connected to the memory module for compressing the image before the image is stored in the memory module; and a decompressor, operatively connected to the pre-processor, for decompressing the image before conveying the image to the pre-processing module.

The third aspect of the present invention is an image processing architecture for use in pre-processing a provided image. The architecture comprises:

a compressor module, adapted to compress the provided image for providing a compressed image;

a memory module for storing the compressed image;

a decompressor module, adapted to retrieve the stored image from the memory module for providing a decompressed image; and a pre-processing module, coupled to decompressor module, for receiving the decompressed image, wherein the compressor module, the memory module, the decompressor module and pre-processing module are arranged to form a loop, and the pre-processing module is operatively connected to a plurality of pre-processing parameter sets, so as to allow the pre-processing module to pre-process the stored image in multiple times, wherein the parameter sets used for pre-processing in at least some of the multiple times are different from the parameter sets used for pre-processing in other of the multiple times, and wherein the decompressor module is configured for receiving the provided image, wherein the decompressor module is operable in a bypass mode for conveying the provided image to the pre-processing module as received, and the pre-processing module is operable in a bypass mode for sending to the compressor module the provided image as conveyed from the decompressor module, so as to allow the compressor module to compress the provided image as received.

The architecture further comprises a further processing module, operatively coupled to the pre-processing module, for further processing the provided image after the provided image is compressed, stored, decompressed, and processed in the pre-processing module multiple times, where the further processing comprises color filter array interpolation and white balance processing.

The fourth aspect of the present invention is an imaging device comprising:

a mechanism for acquiring an image; and a pre-processing module as described above.

The imaging device further comprises a further processing module, operatively coupled to the pre-processing module, for further processing the provided image after the provided image is compressed, stored, decompressed, and processed in the pre-processing module multiple times.

In one embodiment of the present invention, the mechanism comprises an image sensor for acquiring the image, and imaging optics for forming an image on the image sensor.

In another embodiment of the present invention, the mechanism comprises a receiver for receiving image data of the image.

According to the present invention, the imaging device may comprise a post-processing module for post-processing the image data so that the image can be displayed on a display or transferred out for printing, for example. Thus, the imaging device may include a transmitter for transmitting the processed image data.

The imaging device can be a digital camera, a mobile phone, a personal digital assistant, a communicator device or the like.

BRIEF DESCRIPTION OF THE DRAWINGS

FIG. 6 is a block diagram illustrating an image acquisition device having the imaging architecture, according to the present invention.

DETAILED DESCRIPTION OF THE INVENTION

The present invention provides a method and an image architecture wherein the raw image can be pre-processed a number of times by the same pre-processing block using an image data loop before the pre-processed image is provided to a main processing block. Advantageously, the pre-processing block is a hardware module wherein the parameter sets for pre-processing can be selected so that each run through the pre-processing block is carried out with a different parameter set. For example, one parameter set is for shading compensation and another set is for dead pixel correction. Other parameter sets may include the parameters for dark current elimination, pixel linearization, noise reduction and green imbalance filtering. Further parameter sets may include the parameters that are dependent on physical temperature, color temperature and lens position.

Figure 1:
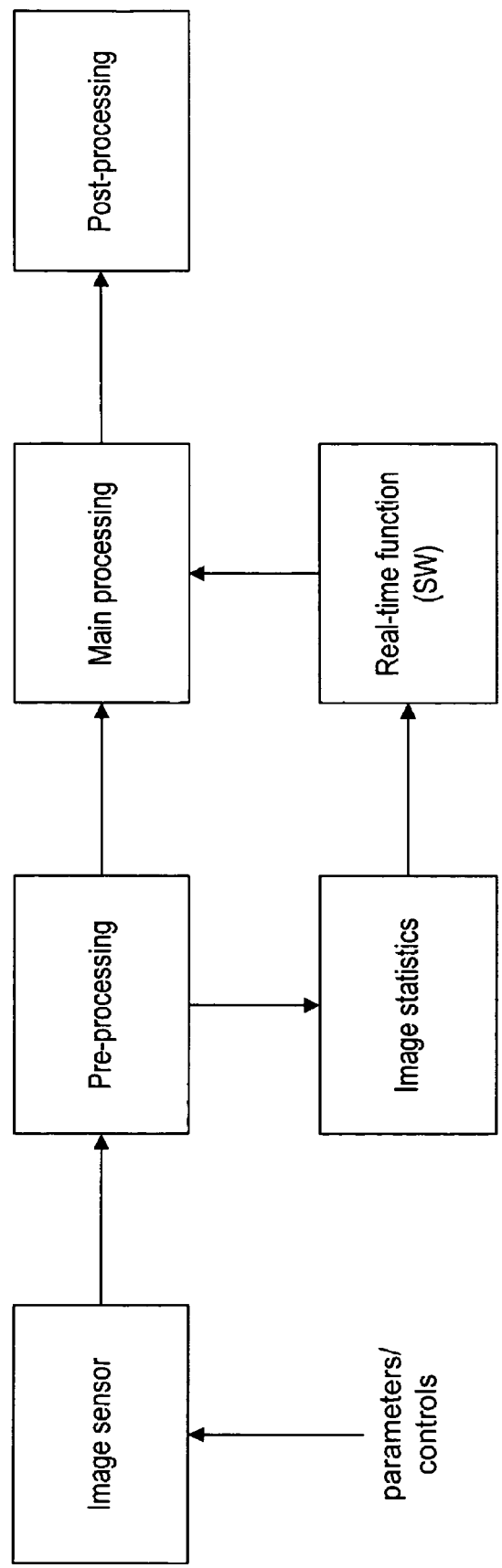
FIG. 1 shows a prior art imaging architecture.
Figure 2:
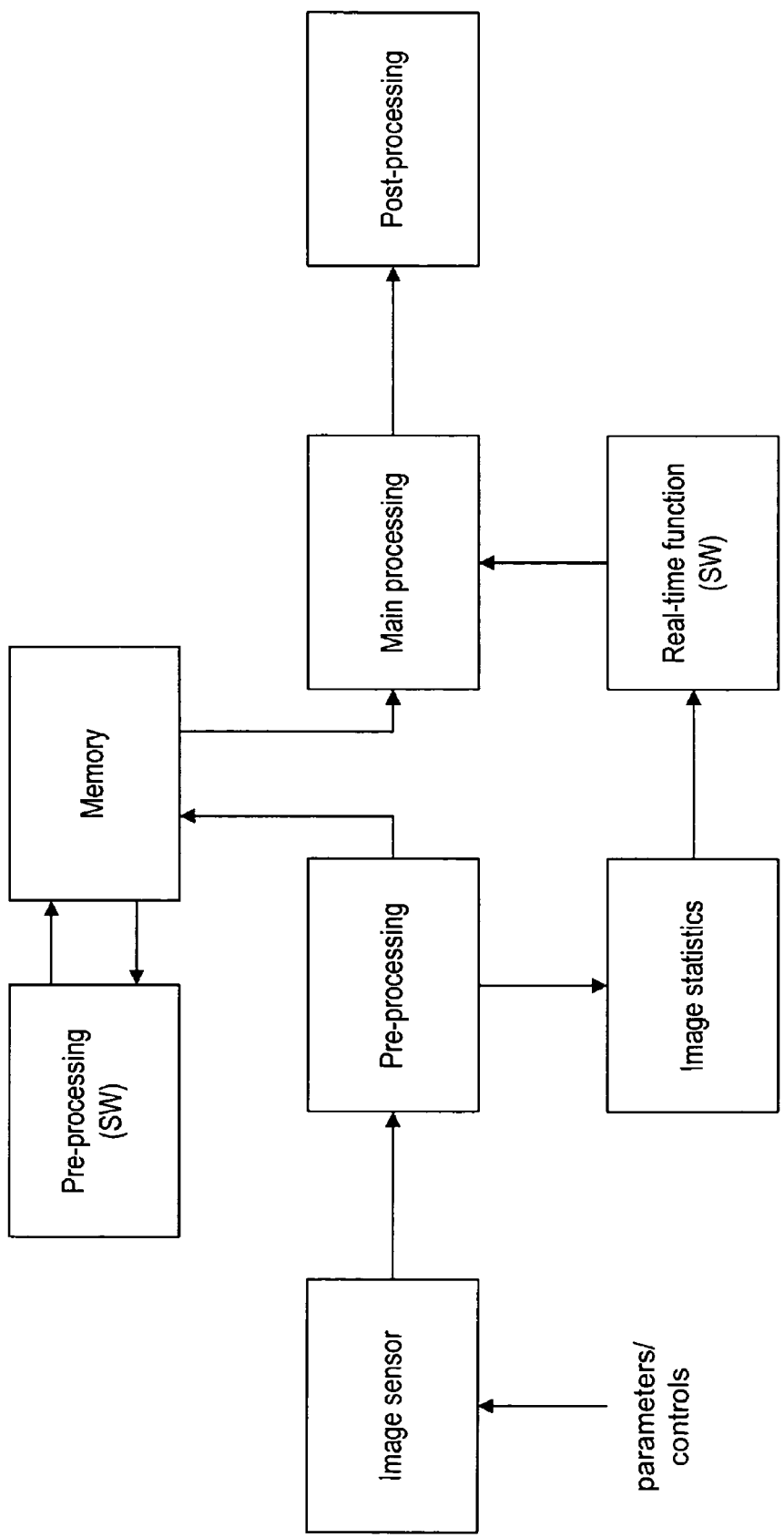
FIG. 2 shows a prior art imaging architecture with a separate memory module.
Figure 3:
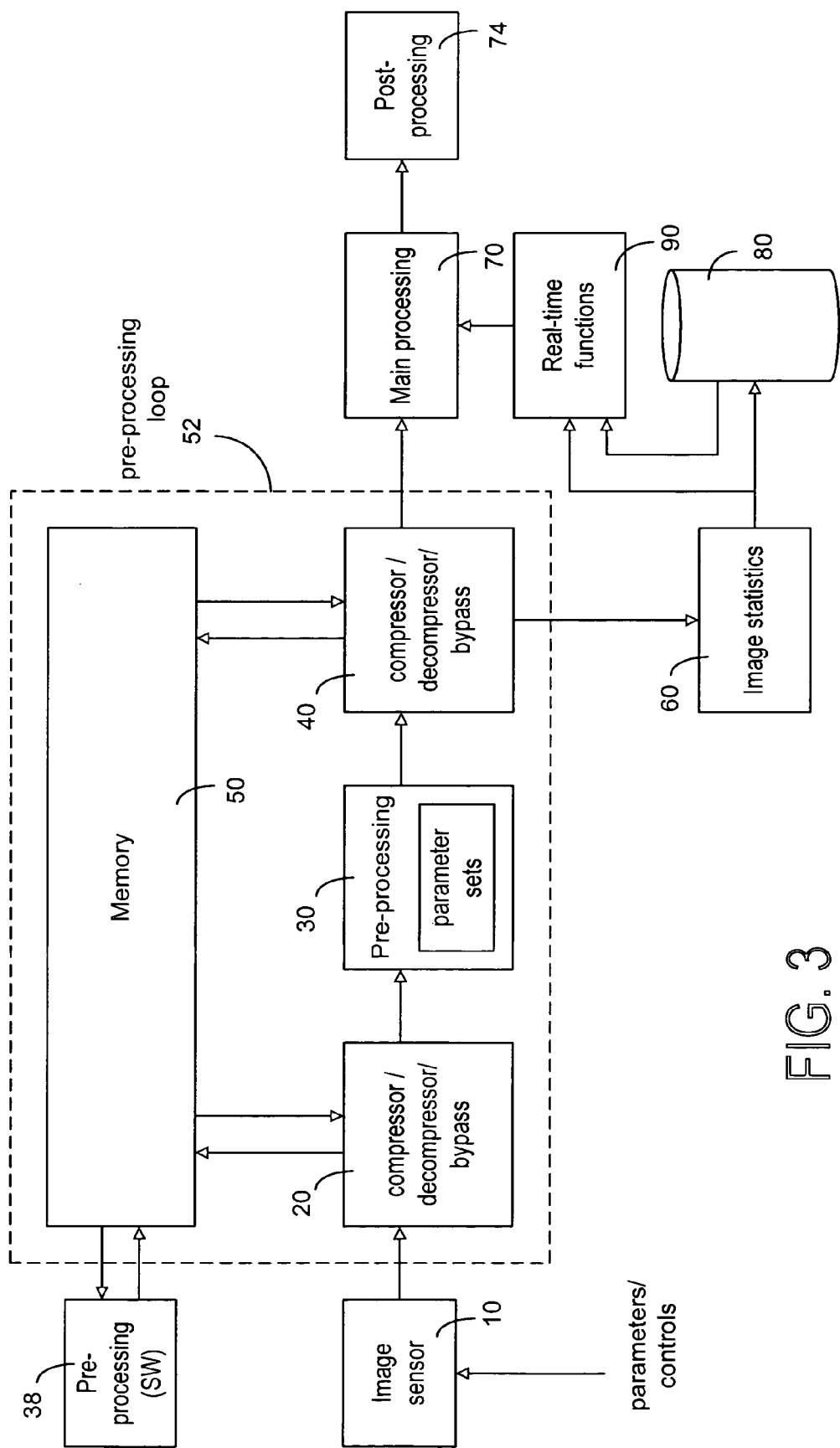
FIG. 3 shows an imaging architecture, according to one embodiment of the present invention.

The imaging architecture, according to one embodiment of the present invention, is shown in FIG. 3. As shown, the architecture comprises a hardware pre-processing block 30 located between a first compressor/decompressor module 20 and a second compressor/decompressor module 40. The first compressor/decompressor module 20 receives raw image from an image sensor 10. A memory module 50 having two ports connected to the first compressor/decompressor module 20 and other two ports connected to the second compressor/decompressor module 40 is used to stored the raw image, preferably in a compressed form. The memory module 50, the first compressor/decompressor module 20, the pre-processing module 30 and the second compressor/decompressor module 40 form an image processing loop 52 so as to allow the raw image to be pre-processed through the pre-processor block multiple times. Each pre-processing run can be done with a different pre-processing parameter sets. However, if it is necessary or desirable, two or more pre-processing runs can be done with the same parameter set. After the multi-run pre-processing, the pre-processed raw image is conveyed to the main processing module 70 for further processing. The processing in the main processing module typically includes color filter array interpolation (CFAI) and white balance (WB). An image statistics block 60 is used to collect image statistics from the raw image for imaging control purposes. Image controls may include automatic exposure control, automatic focus control, automatic white balance control, etc. After the main processing stage, the processed image data is conveyed to a post-processing block 74 so that the processed image can be displayed or printed. In the imaging architecture as shown in FIG. 3, the raw image can be put into the memory before pre-processing. It should be noted that the compressor/decompressor blocks 20 and 40 may have a bypass mode so that the image data can be stored in the memory module 50 in a non-compressed form. Furthermore, compression/decompression can be applied separately for smaller areas of an image with or without the pre-processing steps.

Additional pre-processing can also be made by SW block 38 as a memory-to-memory operation.

Figure 4:
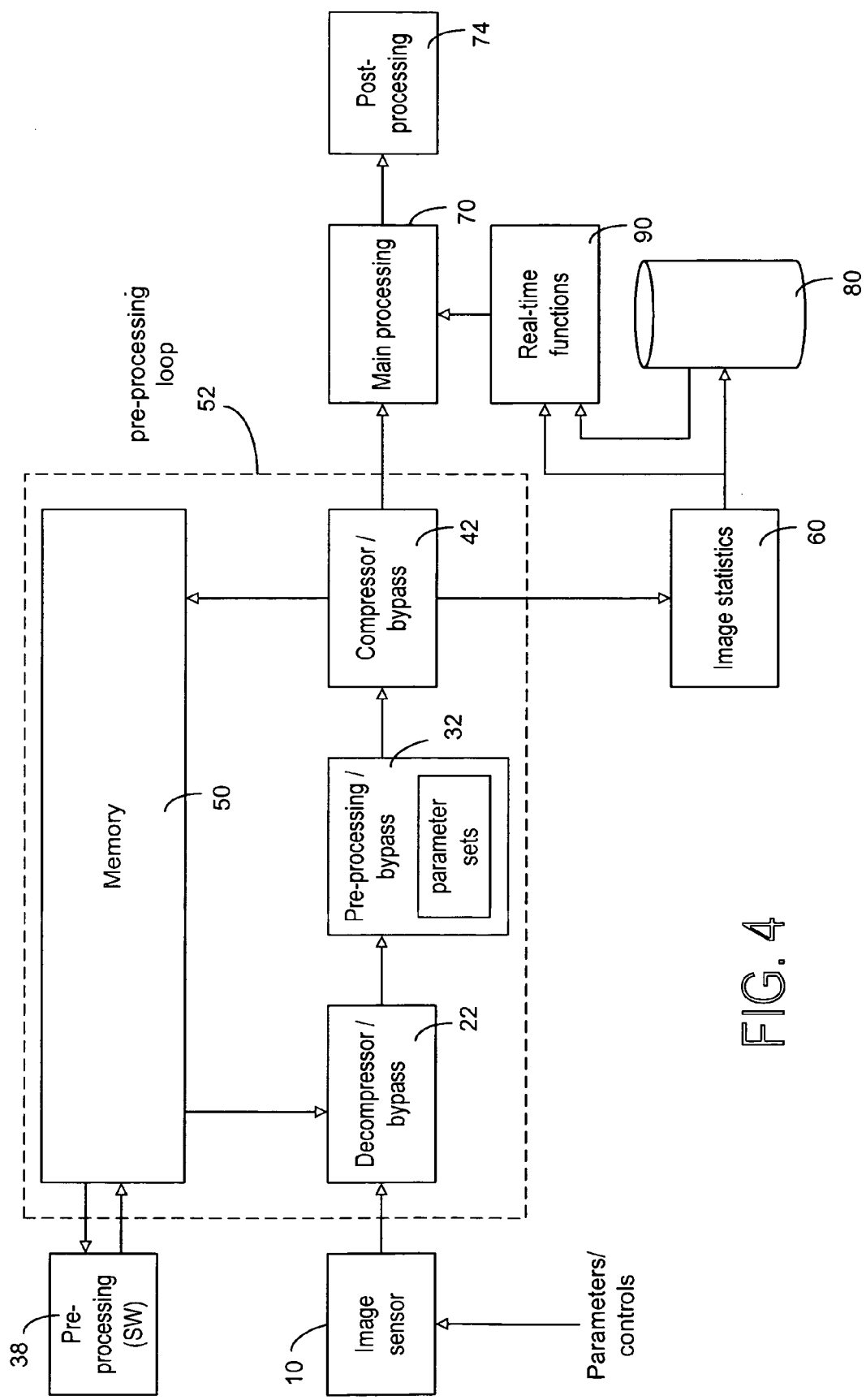
FIG. 4 shows another imaging architecture, according to a different embodiment of the present invention.

According to another embodiment of the present invention, the memory module 50 in the imaging architecture has only two ports. As shown in FIG. 4, one port is connected to a decompressor module 22 and the other port is connected to a compressor module 42. The decompressor module 22 is located before a pre-processing module 32, whereas the compressor module 42 is located after the pre-processing module 32. Each of the decompressor module 22, the pre-processing module 32 and the compressor module 42 includes a bypass mode. As such, when the raw image is first received from the image sensor 10, the decompressor module 32 and the pre-processing module 32 are set to the bypass mode. In order to lower the load of the memory bus on the memory module 50, the raw image is compressed by the compressor module 42 before it is stored in the memory module 50. The compressed image can be read multiple times from the memory module 50 and decompressed by the decompressor module 22. The decompressed image is then processed by the pre-processing module 32 with a selected parameter set. If further pre-processing is desired or required, the processed image is again compressed by the compressor module 42 and the compressed image is stored in the memory module 50. When the pre-processing is completed, the decompressed image pre-processed by the pre-processing module 32 in the last run is directly conveyed to the main processing module 70, while the compressor module 42 is set to the bypass mode.

With the imaging architecture as shown in FIG. 3, the received image from the image sensor 10 can be compressed in the compressor/decompressor module 20 and directly stored in the memory module 50 in the first run without going through the pre-processing module 30 and the compressor/decompressor module 40. In the subsequent runs, stored image is retrieved from the memory module 50 and decompressed by the compressed/decompressor module 20 before the image is conveyed to the pre-processing module 30. After being pre-processed by the pre-processing module 30, the image is compressed before it is stored. When the pre-processing is completed, the compressed image can be read out from the memory module 50 and decompressed by the compressor/decompressor 40 before it is conveyed to the main processing module 70. Alternatively, the compressor/decompressor module 40 also has a bypass mode so that the image pre-processed by the pre-processing module 30 in the last run can be directly conveyed to the main processing module 70.

The image statistics collected by the image statistics module 60 can be stored in a database 80. As shown in FIGS. 3 and 4, a real-time function block 90 is operatively coupled to the image statistics module 60 and/or the storage 80 so that the real-time function can use the data from the storage 80 or directly from the image statistics block 60. Real-time functions such as automatic exposure need (statistical) information from the image. Other real time functions include automatic white balance and auto focus. The statistical information from the image is normally collected with a hardware statistics block. Real-time functions are typically carried out by a software block in order to provide various parameters to the main processing.

It should be noted that, the image stored in the memory module can be pre-processed as a whole or in parts. For example, the whole image is first pre-processed and compressed for storage in the memory module. The stored image is divided into parts and the parts are separately run through the image statistics block so as to allow the image statistics block to collect sub-image statistics. The stored image can also be divided into image blocks. The whole image or only certain image blocks are pre-processed a number of times for dead pixel correction purposes. In each run, a new look-up table is loaded onto the pre-processing block to provide the relevant parameter set. Look-up tables can be located inside the pre-processing module. Each look-up table may have 100 or 1000 positions and corrections. It may be beneficial to pre-process an image in different regions if there are many defects in the image such that different defect pixel positions are corrected in each run. The look-up values can be downloaded from other memories, for example. Similarly, when the image is run through the pre-processing block for shading compensation, for example, a set of relevant parameters and an algorithm are provided to the pre-processing block.

It should be also noted that compression/decompression of image improves the memory utilization, but it is not a mandatory part of the system. Compression and decompression can be also applied separately for smaller areas of image with or without the pre-processing steps. Furthermore, the small amount of image data (slice/block) can be stored to the memory as decompressed form so that either HW or SW pre-processing steps can be done without decompressing/compressing image data back and forth.

The potential advantages of the present invention include:
A) Less memory used for the raw image:
   Less bandwidth required;
   Less activity on the memory bus;
   Less storage space required, so smaller memory chips can be used;
   Higher resolution sensors can be used.
B) No real time requirements:
   Less bandwidth required;
   Higher resolution sensors and faster interfaces can be used;
   Image can be processed as stripes, slices or blocks;
   Pixel clock and processor clock does not need to be in synchronization;
   Receiving the image or processing the image can be done faster then the other.
C) Multi-phase pre-processing and statistics calculation:
   More accurate statistics without adding more hardware;
   Better image processing with different parts of images with simpler hardware. Thus, a pre-processing block can be smaller and the size of look-up tables can be smaller due to multiple run processing.
D) Possibility to process the same part of image different ways in multiple runs:
   Slice/stripe/block processing;
   Sub-image processing with optimized parameters tailored for each sub-image.
E) Faster and higher quality processing with lower power consumption:
   Enables utilization of hardware pipeline;
   Enables possibility to use new pre-, main- or post-processing algorithms;

Pre-processing hardware block can be configured to suit the need in the multi-pass approach. For example, different white balance gains for different parts of the image in a mixed light condition can be achieved.

In image encoding, the compressed image can be decoded by hardware and processed from the memory module line-by-line. As such, the total memory consumption is smaller.

Figure 5:
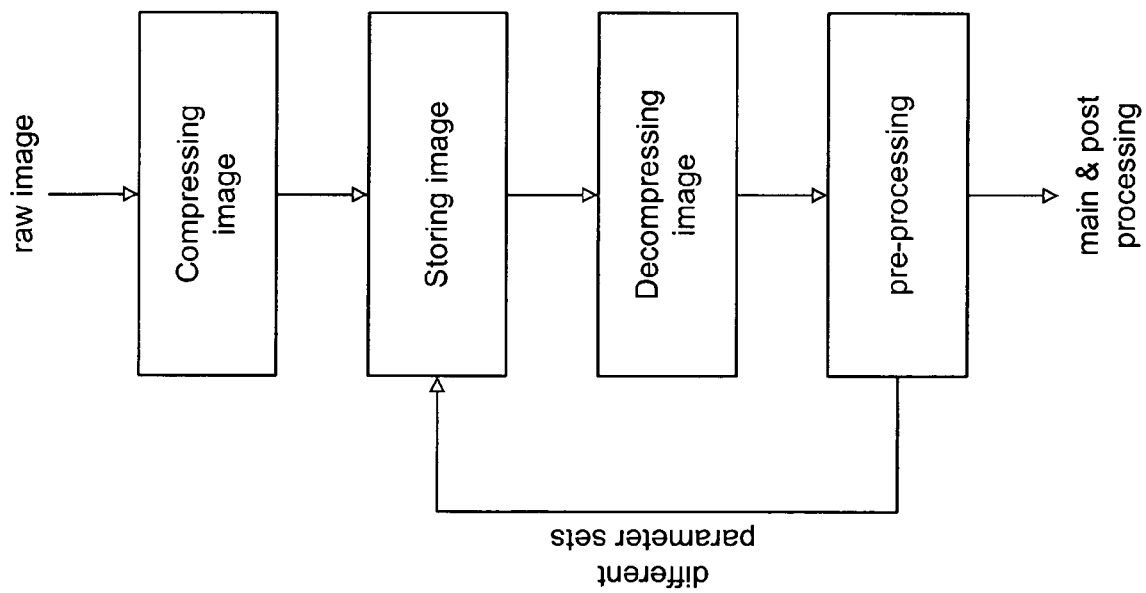
FIG. 5 is a flowchart illustrating the method of image processing, according to one embodiment of the present invention.

In sum, the present invention provides a method for pre-processing image data, as illustrated in FIG. 5. The method includes storing a raw image in a memory module; coupling a pre-processing module to the memory module to form a processing loop, wherein the pre-processing module is operatively connected to a plurality of pre-processing parameter sets; and conveying the image from the memory module to the pre-processing module via the loop so as to allow the pre-processing module to pre-process the image in multiple times, wherein the parameter sets used for pre-processing in at least some of the multiple times are different from the parameter sets used for pre-processing in other of the multiple times. The method further comprises compressing the image for providing a compressed image before storing the image in the memory module; retrieving the compressed image from the memory module; and decompressing the retrieved image before conveying the image to the pre-processing module. Accordingly, the present invention provides an image architecture that includes: a compressor module adapted to compress a raw image for providing a compressed image; a memory module for storing the compressed image; a decompressor module, adapted to retrieve the stored image from the memory module for providing a decompressed image; and a pre-processing module, coupled to decompressor module, for receiving the decompressed image, wherein the compressor module, the memory module, the decompressor module and pre-processing module are arranged to form a loop, and the pre-processing module is operatively connected to a plurality of pre-processing parameter sets, so as to allow the pre-processing module to pre-process the stored image in multiple times, wherein the parameter sets used for pre-processing in at least some of the multiple times are different from the parameter sets used for pre-processing in other of the multiple times. The architecture also includes a main processing module, operatively coupled to the pre-processing module, for further processing the provided image after the raw image is compressed, stored, decompressed, and processed in the pre-processing module multiple times.

The image processing architecture and method can be used in an imaging device as shown in FIG. 6. As shown in FIG. 6, the imaging device 100 comprises an image acquisition block 5 for acquiring raw image data for processing. The image acquisition block 5 may include image forming and capturing optics and sensor for providing raw image data to the preprocessing loop 52. The image acquisition block 5 may only have a receiver for receiving raw image data from a remote source or a connected source. The received raw image data can be compressed or in a non-compressed form. The imaging device 100 further comprises a main processing block 70, a real-time function block 90 and an image statistics block 60 with a storage unit 80 as described above. The imaging device 100 may also include a post-processing block 74 to provide image data to a display 98. Alternatively, the processed image data can be conveyed to another device or a network component via a transmitter 120.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method comprising:
   storing image data of an image in a memory, the image data arranged in a raw format; and
   conveying the image data from the memory to a pre-processor comprising a pre-processing loop for pre-processing the image data in the raw format in multiple times, wherein the pre-processor is configured to access a plurality of pre-processing parameter sets, and wherein the parameter sets used for pre-processing in at least some of the multiple times are different from the parameter sets used for pre-processing in other of the multiple times, wherein the image data in the raw format stored in the memory comprises compressed image data, said method further comprising:
   retrieving the compressed image data from the memory for providing retrieved data;
   decompressing the retrieved data for providing decompressed data; and then
   conveying the decompressed data to the pre-processor for pre-processing.

2. A method according to claim 1, further comprising
   further pre-processing the image in a memory-to-memory operation separately from the pre-processing via the pre-processing loop.

3. An apparatus, comprising:
   a memory configured to receive and store compressed image data of an image, the image data arranged in a raw format, the memory comprising a first port and a different second port; and
   a pre-processor configured for:
      retrieving the compressed image data from the memory via the first port,
      decompressing the retrieved image data for providing decompressed image data,
      pre-processing the decompressed image data for providing pre-processed image data, and
      conveying the pre-processed image data to the memory via the second port in a pre-processing loop so as to allow the pre-processor to pre-process the image data in the raw format in multiple times.

4. An apparatus according to claim 3, further comprising:
   a compressor, operatively connected to the pre-processor, for providing the compressed image data to the memory; and
   a decompressor, operatively connected to the pre-processor, for said decompressing.

5. An apparatus according to claim 3, further comprising:
   a further pre-processor, coupled to the memory, for further preprocessing the compressed image data in a memory-to-memory operation.

6. An apparatus according to claim 3, wherein the pre-processor is configured to access a plurality of pre-processing parameter sets for pre-processing the decompressed image data, and wherein the parameter set for pre-processing in at least one of the multiple times is different from the parameter set used for pre-processing in another of the multiple times.

7. An image processing architecture, comprising:
   a memory configured to store compressed image data of an image, the image data arranged in a raw format, the memory comprising a first port and a different second port;

a decompressor, adapted to retrieve the stored compressed image data from the memory via the first port for providing decompressed image data;

a pre-processor, coupled to decompressor, for receiving and pre-processing the decompressed image data for providing pre-processed image data; and a compressor, coupled to the pre-processor, for compressing the pre-processed image data and conveying compressed pre-processed image data to the memory via the second port in a loop so as to allow the pre-processor to pre-process the image data in the raw format in multiple times.

8. An image processing architecture according to claim 7, further comprising:

a further processor, operatively coupled to the pre-processor, for further processing the image data in the raw format after the image data in the raw format is processed in the pre-processor multiple times.

9. An image processing architecture according to claim 8, wherein said further processing comprises color filter array interpolation and white balance processing.

10. An image processing architecture according to claim 7, wherein the decompressor and the pre-processor are operable in a bypass mode for receiving the image and sending the image as received to the compressor, so as to allow the compressor to provide the compressed image data of the image to the memory for storing.

11. An imaging apparatus comprising:

a mechanism arranged to acquire an image;

a memory configured to store compressed image data of the image, the image data arranged in a raw format, the memory comprising a first port and a second port in a pre-processing loop;

a pre-processor configured for:

retrieving the compressed image data from the memory via the first port for providing retrieved data, decompressing the retrieved data for providing decompressed data, pre-processing the decompressed data for providing pre-processed data, and conveying the pre-processed data to the memory via the second port so as to allow the pre-processor to pre-process the image data in a raw format in multiple times.

12. An imaging apparatus according to claim 11, further comprising:

a compressor, operatively connected to the pre-processor, for providing the compressed image data to the memory; and a decompressor, operatively connected to the pre-processor, for said decompressing.

13. An imaging apparatus according to claim 11, wherein the mechanism comprises an image sensor for acquiring the image.

14. An imaging apparatus according to claim 13, further comprising imaging optics for forming an image on the image sensor.

15. An imaging apparatus according to claim 11, wherein the mechanism comprises a receiver for receiving image data of the image.

16. An imaging apparatus according to claim 11, wherein the pre-processor is configured for providing the pre-processed data, said imaging apparatus further comprising:

a main processor, coupled to the pre-processor, for receiving the pre-processed data.

17. An imaging apparatus according to claim 16, wherein the main processor is configured for providing further processed data, said imaging apparatus further comprising:

a post-processor, coupled to the main processor, for receiving the further processed data.

18. An imaging apparatus according to claim 17, wherein the post-processor is configured for providing post-processed data, said imaging apparatus further comprising:

a display, coupled to the post-processor, for receiving the post-processed data.

19. An imaging apparatus according to claim 17, wherein the post-processor is configured for providing post-processed data, said imaging apparatus further comprising:

a transmitter, coupled to the post-processor, for receiving the post-processed data for transmission.

20. An imaging apparatus according to claim 16, wherein the main processor is configured for providing further processed data, said imaging apparatus further comprising:

a transmitter, coupled to the main processor, for receiving the further processed data for transmission.

21. An imaging apparatus according to claim 11, further comprising:

a further processor, operatively coupled to the pre-processor, for further processing the image data in the raw format after the image data in the raw format is pre-processed in the pre-processor multiple times.

22. An imaging apparatus according to claim 11, comprising a digital camera.

23. An imaging apparatus according to claim 11, comprising a mobile phone.

* * * * *